United States Patent [19]

Ritchie

[11] 4,216,831
[45] Aug. 12, 1980

[54] GOLF CLUB ATTACHMENT FOR RAKING SAND TRAPS AND RETRIEVING GOLF BALLS

[76] Inventor: David A. Ritchie, Norwood Heights, Annisquam, Gloucester, Mass. 01930

[21] Appl. No.: 23,144

[22] Filed: Mar. 23, 1979

[51] Int. Cl.² .......................... A63B 57/00; A01B 1/00
[52] U.S. Cl. .................................. 172/380; 294/19 A; 273/32 B; 273/162 E; 56/400.04; 273/32 F
[58] Field of Search ........................ 56/400.01, 400.04; 273/32 B, 32 F, 162 R, 162 B, 162 E, 162 F; 294/19 A; 172/378, 380

[56] References Cited

U.S. PATENT DOCUMENTS

| | | | |
|---|---|---|---|
| 1,524,421 | 1/1925 | Brady | 273/32 B |
| 1,657,322 | 1/1928 | Shinn | 273/32 B X |
| 2,721,755 | 10/1955 | Walner | 273/32 F |
| 3,146,831 | 9/1964 | McConnell | 56/400.04 X |
| 3,210,111 | 10/1965 | Fallon | 273/32 F X |
| 3,440,810 | 4/1969 | Rhyme | 56/400.01 |
| 3,870,300 | 3/1975 | Amendola | 273/32 B |
| 4,102,405 | 7/1978 | Carman | 273/32 B X |

OTHER PUBLICATIONS

"Golf Digest", Jan., 1972, p. 91.

Primary Examiner—George J. Marlo
Attorney, Agent, or Firm—Kenway & Jenney

[57] ABSTRACT

A rake head for attachment to a handle such as a golf club shaft has a mounting bracket that removably and replaceably seats on the club shaft and which carries a pair of rake blades. The rake blades are rotatable between an in-line, deployed position and a folded, collapsed position. Abutments limit the rotation of the rake blades, and a holding structure maintains the rake blades in the deployed position.

11 Claims, 5 Drawing Figures

U.S. Patent  Aug. 12, 1980  4,216,831
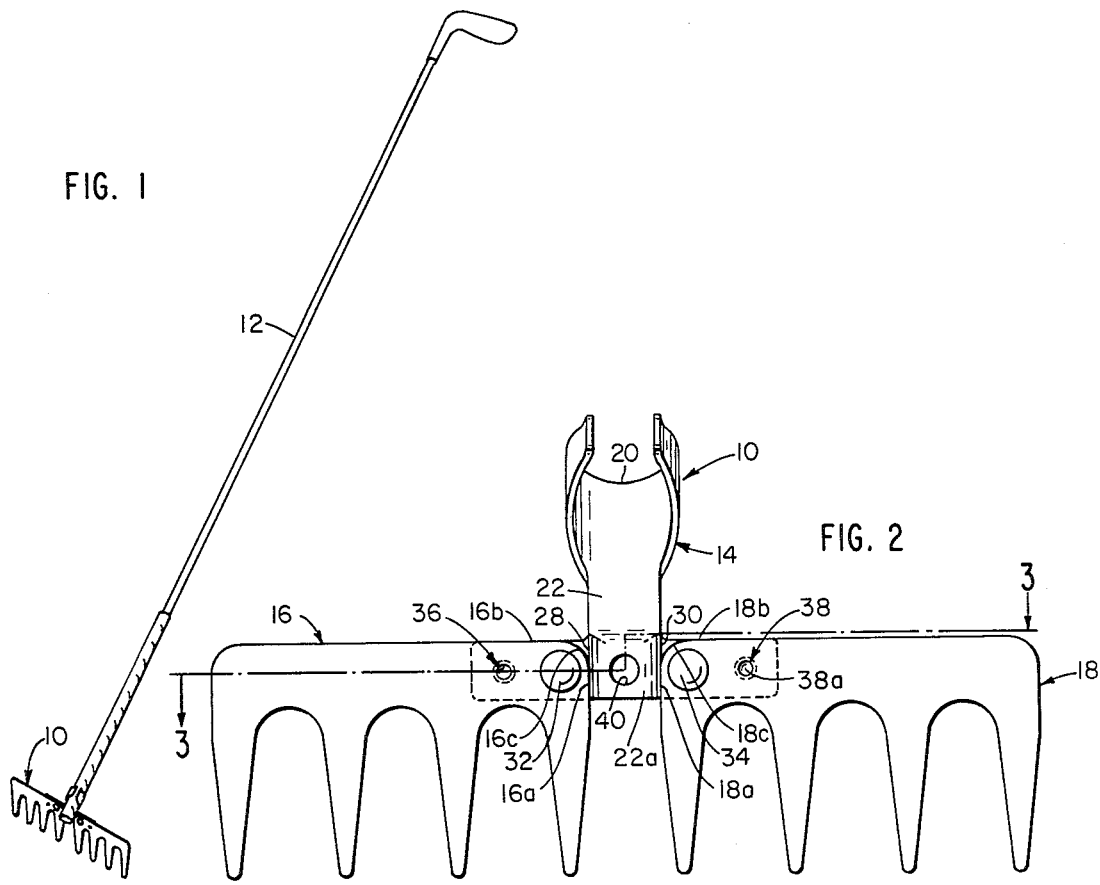
FIG. 1
FIG. 2
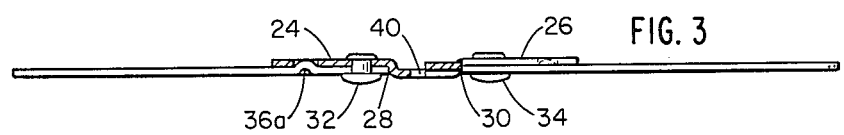
FIG. 3
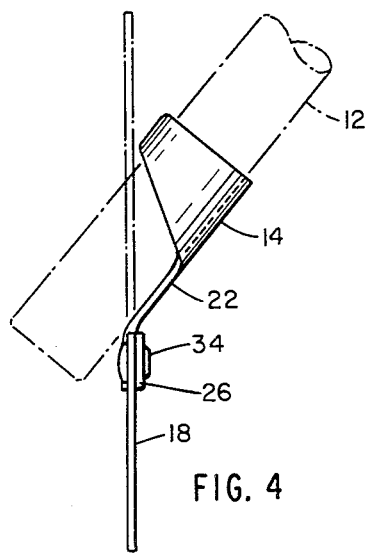
FIG. 4
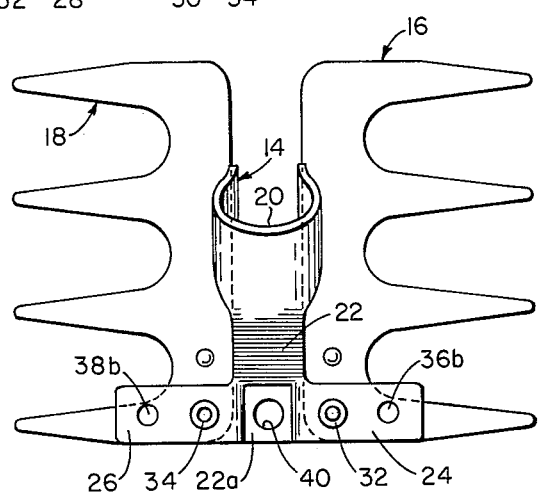
FIG. 5

GOLF CLUB ATTACHMENT FOR RAKING SAND TRAPS AND RETRIEVING GOLF BALLS

BACKGROUND OF THE INVENTION

This invention relates to a collapsible rake head of the type suitable for temporary attachment to a golf club shaft. A rake head of this type is a useful adjunct to a golfer's equipment for leveling footprints and other disturbances after a golfer has played out of a sand trap. Another use is in retrieving golf balls from waterways and like inaccessible locations.

Rake heads for golfers are known in the art, as disclosed in U.S. Pat. Nos. 2,721,755 and 3,870,300. The former patent discloses a rake head attachable to a golf club shaft for retrieving golf balls, and the latter patent discloses a device that holds golf tees in a manner such that they form the teeth of a rake. A "handy sandy" sand trap rake and golf ball retriever is advertised on page 91 of the January 1972 issue of "Golf Digest", and it too mounts on a club shaft that forms the rake handle.

An object of this invention is to provide a rake head, suitable for temporary attachment to a golf club shaft or like handle, which can assume a compact configuration when not in use. Known rake heads which have permanent teeth are relatively bulky and hence inconvenient to store and carry. Further, the teeth protrude in a manner likely to snag clothing and other items. The noted prior rake which forms teeth of golf tees is less bulky when stored without such teeth, but the teeth formed by the tees are relatively inefficient for raking.

Another object of this invention is to provide a golf rake head that is collapsible for storage and yet which deploys to form a relatively sturdy raking implement.

Other objects of the invention will in part be obvious and will in part appear hereinafter.

GENERAL DESCRIPTION

A rake head according to the invention has a mounting bracket with a slotted collar that removably seats on a golf club shaft in a manner such that the shaft serves as the rake handle. The mounting bracket carries a pair of projecting members, and a rake blade is mounted on each member. The two rake blades are rotatable relative to the bracket between a collapsed position and a deployed position. In the collapsed position, the two rake blades are closely adjacent the mounting bracket, whereas in the deployed position they are aligned with one another for raking.

A bridging member on the mounting bracket interconnects the blade-mounting members, and joins them to the collar. the bridging member in addition forms shoulders against which the rake blades abut when fully rotated to the deployed position and, again, to the collapsed position. The bridging member shoulders thus serve as positive stops which facilitate placing the rake blades in one of the two positions.

A further feature of the rake head is structure which provides a holding action that resists dislodgement of the rake blades from the deployed position. The rake head according to the invention thus maintains the open, deployed position even upon encountering firm ground or weighty objects that would otherwise tend to collapse the structure. In one form, the invention provides this holding action with a frictional engagement between each rake blade and the associated mounting member. A detent mechanism can also provide the holding action, either alone or in conjunction with frictional engagement.

These and other structural features of the rake head according to this invention can be provided with three readily formed parts assembled with the rotational connections. The rake head thus is suitable for manufacture at low cost, yet provides a solid rake tool which is light in weight and relatively attractive in appearance. Moreover, the rake head is highly collapsible for compact transport and storage.

The invention accordingly comprises the features of construction, combination of elements, and arrangement of parts exemplified in the construction hereinafter set forth, and the scope of the invention is indicated in the claims. For a fuller understanding of the nature and objects of the invention, reference should be had to the following detailed description, taken in connection with the accompanying drawings, in which:

FIG. 1 is a pictorial representation of a rake head according to the invention deployed on a golf club shaft;

FIG. 2 is a front elevation view of a rake head according to the invention;

FIG. 3 is a partial sectional view of the rake head of FIG. 2 taken along line 3—3;

FIG. 4 is a side elevation view of the rake head of FIGS. 1 and 2; and

FIG. 5 is a back elevation view of the rake head of FIG. 2, in the collapsed position.

DESCRIPTION OF ILLUSTRATED EMBODIMENT

A rake head 10 as shown in FIG. 1 seats tightly on the butt end of a golf club shaft 12 to form a rake in which the club shaft is the handle. The diameter of a conventional club shaft, as shown, tapers downward from a large dimension adjacent the butt end to a small dimension as one approaches the club head. This tapered shaft structure enables the rake head to be fitted onto a small diameter section of the slub shaft, near the club head, and to be slid along the shaft toward the butt end, where the rake head clamps securely on the enlarged shaft diameter to the configuration which FIG. 1 shows.

With reference to FIGS. 2 and 3, the rake head 10 is constructed with a mounting bracket 14 and with two rake blades 16 and 18. The illustrated mounting bracket 14 is a one-piece structure with a tubular collar 20 from which a bridging arm 22 extends axially. The tubular collar 20 is axially slotted, as appears in FIGS. 1 and 2, and hence is an open tubular structure; the opening allows the collar to be fitted over a small diameter section of the golf club shaft 12. Two mounting tabs 24 and 26 extend from the arm 22 in opposite directions from one another along an axis transverse to the axis of the tubular collar; the golf club shaft 12 of FIG. 1 extends along the latter axis. As appears in FIG. 4, where the solid showing is of the rake member in the deployed configuration, the bridging arm 22 extends axially from the collar, illustratively circumferentially opposite the aforementioned slot, for a short distance to a distal end portion 22a that is bent away from the collar axis. It is from this distal end portion 22a of the bridging arm that the mounting tabs 24 and 26 extend, as shown. The distal end portion 22a, moreover, is raised relative to the mounting tabs to form a stop shoulder 28, 30 at each juncture with a tab. The mounting bracket 14, and the rake blades 16 and 18, can, for example, be fabricated of sheet metal or of plastic material.

With further reference to FIGS. 2, 3 and 4, the rake blades 16 and 18 are essentially flat, as if made from sheet stock material, and preferably are symmetrical in the sense that one is the mirror image of the other. Each rake blade, illustrated as having four rake teeth, is mountingly attached at one corner to one mounting tab 24, 26, in a manner that allows the blade to rotate about the connection relative to the mounting bracket. The illustrated rake head provides this rotatable connection with a rivet 32, 34 fastening each rake blade to a mounting tab 24, 26, respectively. The resultant rotations of the two rake blades relative to the mounting bracket are in a common plane, i.e. the plane of the blade structure. The rotation allows each blade to move between the deployed position shown in FIGS. 2, 3 and 4 (solid showing) and a folded collapsed position shown in FIG. 5 and shown with dashed lines in FIG. 4. More particularly, in the deployed position the rake blades 16 and 18 are aligned one with another, in a direction transverse to the axis with which the mounting bracket collar 20 supports the golf club shaft, to provide a conventional rake structure. Each rake blade is rotatable by a quarter turn, i.e. substantially 90 degrees, from this deployed position to the collapsed position of FIG. 5. In the latter position, the blades are disposed side-by-side and extend longitudinally of the collar axis, as shown. Note that the two blades rotate in opposite directions in moving from one position to the other.

Each rake blade is configured to abut one stop shoulder 28 and 30 when fully rotated to the deployed position and likewise when rotated to the collapsed position. This positive engagement fixes the disposition of the blades for each position. For this stop-like action, each rake blade has a pair of stop edges 16a, 16b and 18a, 18b oriented at right angles to one another adjacent a blade corner and equally spaced from the rotation axis passing through the rivet connections 32, 34. As shown, the edges 16a and 18a are arranged to abut the mounting bracket stop shoulders 28 and 30 when the blades are rotated fully to the deployed position of FIGS. 2 and 3. The other stop edges 16b and 18b interferingly abut the same shoulders 28 and 30 when the blades are rotated fully to the collapsed position of FIG. 5. The rake blade corners 16c and 18c between these stop edges are rounded, as also shown, to pass freely by the stop shoulders 28 and 30 and thereby allow rotation of the rake blades without interference.

The illustrated rake head includes, as a further feature, a detent mechanism 36, 38 between each rake blade and the associated mounting tab. Each detent mechanism employs a detent protrusion 36a, 38a, illustratively provided on the raking blades, and a mating detent aperture 36b, 38b on the mounting tabs. As shown in FIG. 3, the detent protrusion seats in the detent receptacle only when the blade is rotated to the deployed position. The detent action resists dislodgement of the rake blades from the deployed position but, as conventional with detent mechanisms, can be overridden by manual force to move each rake blade to the collapsed position of FIG. 5. The holding action, which thus maintains each rake blade in the deployed position against inadvertent dislodgement, can be augmented or provided entirely by frictional engagement of each rake blade with its mounting tab and imposed by the clamping action provided by the rivet or other connection between them. The illustrated rake head thus employs both a clamping action by each rivet and the detent action for resisting dislodgement of the blades from the deployed position. In addition, appropriately roughened or otherwise textured surfaces on one or both of the mating surfaces of the blade and tab assembly can augment the frictional engagement. Other structures can be employed for providing the holding action between each rake blade and its mounting tab, including spring-biased structures.

A rake head having the foregoing construction and features is easily stowed, as in a golf bag, by folding the rake blades to the collapsed position of FIG. 5. An alternative way of carrying the rake head is by a hook or other hanger clipped to it at the hole 40 illustrated as pierced through the distal end portion 22a of the bridging arm. The rake head is placed in use by rotating each rake blade a quarter turn to the deployed position. A golf club shaft or other like elongated tapered article is fitted into the collar 20 through the slotted opening, and the rake head is slid along the club shaft to the butt end where the collar compressively engages against the shaft. With the rake head in this deployed engagement with the club shaft as FIG. 1 shows, it functions as a conventional rake. After such use, the rake head is readily removed from the club shaft and returned to the collapsed position.

It will thus be seen that the objects set forth above, among those made apparent from the preceding description, are efficiently attained. Since certain changes may be made in the construction of the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A rake head for removably and replaceably attaching on a handle-forming shaft, said rake head comprising, in combination
   A. a mounting bracket
      (1) having a slotted shaft-engageable collar with a central axis and arranged for said attachment with the shaft extending along said axis, and
      (2) having first and second oppositely-directing blade-mounting members, and
   B. first and second rake blades, each with plural rake teeth, and each mounted to the same-numbered mounting member and rotatable relative thereto between a deployed position, where said blades are aligned one with another along a second axis extending transversely to said collar axis, and a collapsed position rotated substantially a quarter turn from said deployed position.

2. A rake head as defined in claim 1 in which said blade-mounting members are disposed for orienting said rake blades, when in said collapsed position, side-by-side with one another, and extending at least partially longitudinal with said collar axis.

3. A rake head as defined in claim 1 further comprising holding means cooperating with said rake blades and said mounting members for releasably holding said rake blades in said deployed position.

4. A rake head as defined in claim 3 in which said holding means includes means for providing frictional engagement between said rake blades and said mounting members to provide said releasable holding action.

5. A rake head as defined in claim 1 further comprising detent means cooperating with said mounting members and said rake blades for releasably holding said rake blades in said deployed position.

6. A rake head as defined in claim 1 further comprising stop means fixed relative to said mounting bracket and engageable with said rake blades to limit rotation to at least one of said positions.

7. A rake head as defined in claim 6 in which said stop means includes first and second shoulder means disposed on said mounting bracket for abutment with said first and second rake blades respectively upon rotation of said rake blades to said one position.

8. A rake head according to claim 6 in which said stop means includes first and second abutment means disposed on said mounting bracket for abutment with said same-numbered rake blade upon pivotal motion thereof to both said deployed position and to said collapsed position, for limiting the pivotal movement of each rake blade into each of said positions.

9. A collapsible rake head for removably and replaceably deployably detaching on a golf club shaft and thereby suitable for raking golf course sand traps, said collapsible rake head comprising, in combination
A. a mounting bracket
  (1) having a slotted shaft-engageable tubular collar having a central axis and arranged for said deployable attachment with the shaft extending along said axis,
  (2) having first and second oppositely-directed blade-mounting tabs disposed symmetrically to one another relative to said collar, and
  (3) having a bridging member interconnecting said mounting tabs and said collar and providing stepped shoulder surfaces adjacent the interconnection thereof with each said mounting tab, and
B. first and second rake blades, each mounted to the same-numbered mounting tab and rotatable relative thereto between a deployed position, where said blades are aligned one with another along a second axis extending transversely to said collar axis, and a collapsed position rotated substantially a quarter turn from the deployed position.

10. A rake head as defined in claim 9 further comprising a pair of stop edges on each rake blade, each stop edge being disposed for abutment against one shoulder upon rotation of the blade to one of said positions.

11. A rake head as defined in claim 9 further comprising interengageable means on each rake blade and on each mounting tab for resisting dislodgement of said rake blades from said deployed position toward said collapsed position.

* * * * *

UNITED STATES PATENT AND TRADEMARK OFFICE
CERTIFICATE OF CORRECTION

PATENT NO. : 4,216,831
DATED : August 12, 1980
INVENTOR(S) : David A. Ritchie

It is certified that error appears in the above-identified patent and that said Letters Patent are hereby corrected as shown below:

Column 1, line 53, after "collar." change "the" to --The--.

Column 2, line 40, change "slub" to --club--.

Signed and Sealed this

*Twenty-fourth* Day of *November 1981*

[SEAL]

*Attest:*

GERALD J. MOSSINGHOFF

*Attesting Officer*     *Commissioner of Patents and Trademarks*